Figure 3:
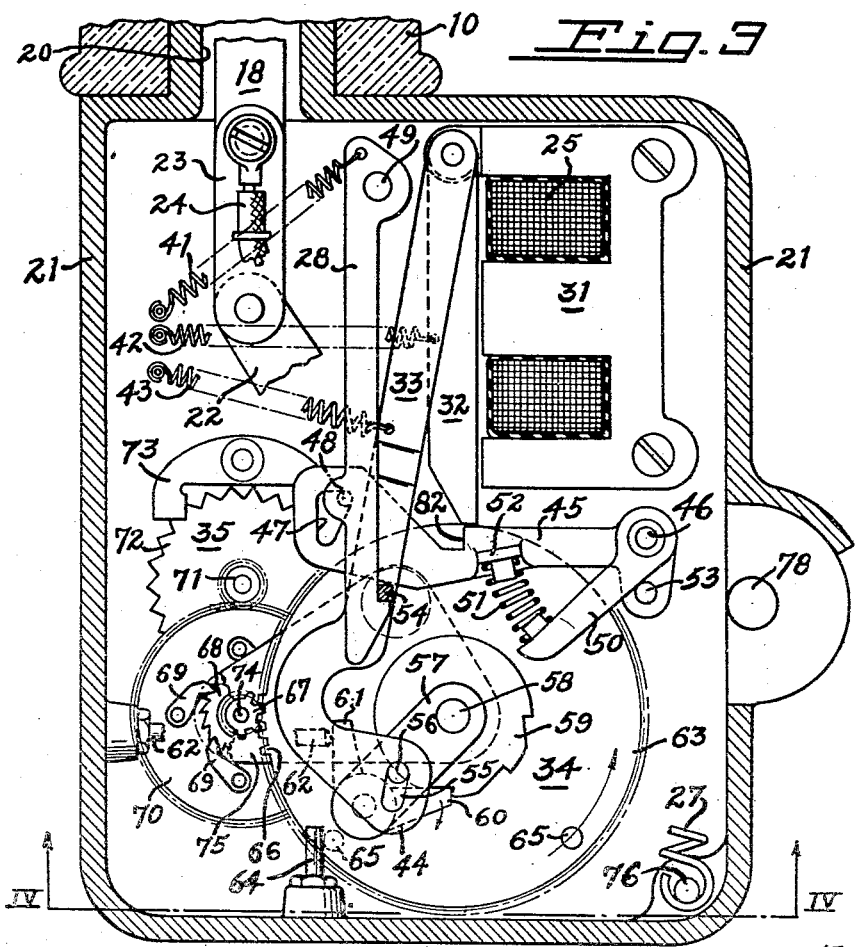

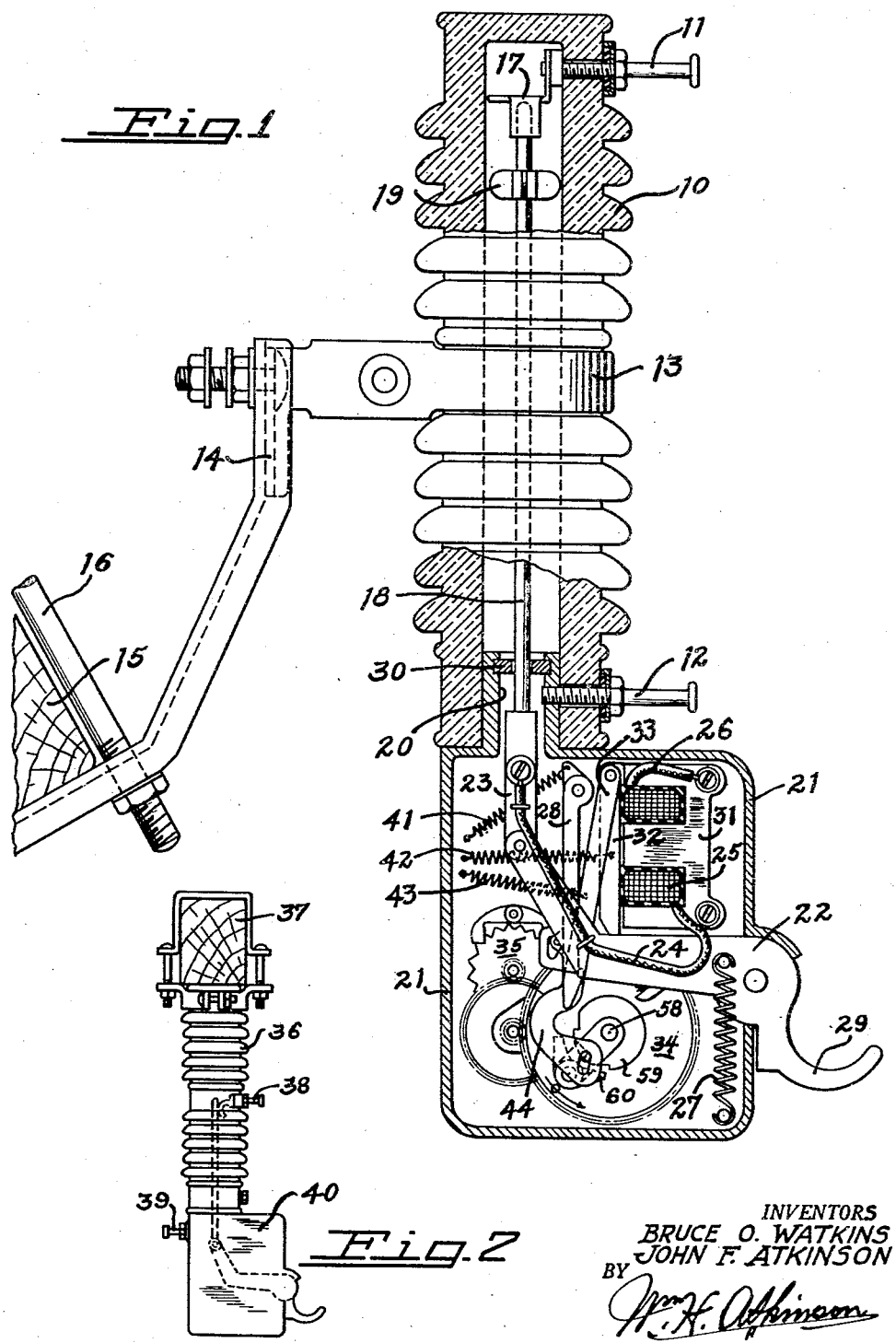

INVENTORS
BRUCE O. WATKINS
JOHN F. ATKINSON
BY
ATTORNEY

Oct. 23, 1945.　　B. O. WATKINS ET AL　　2,387,373
CIRCUIT DISCONNECTING DEVICE
Filed Dec. 28, 1942　　3 Sheets-Sheet 3
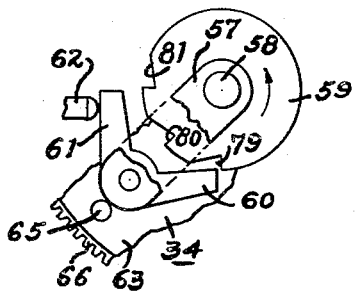
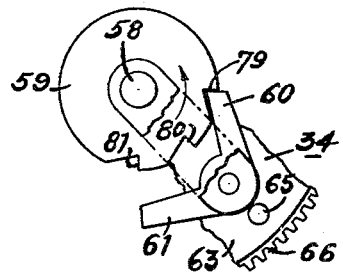
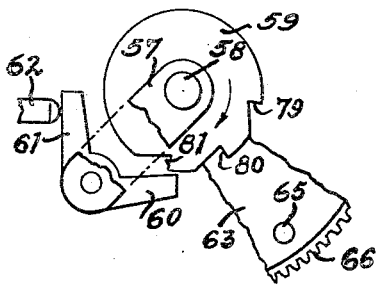
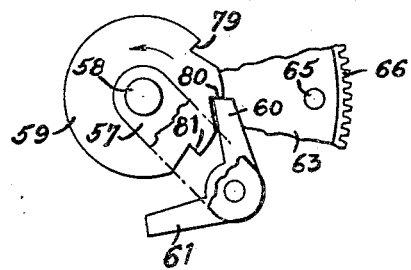
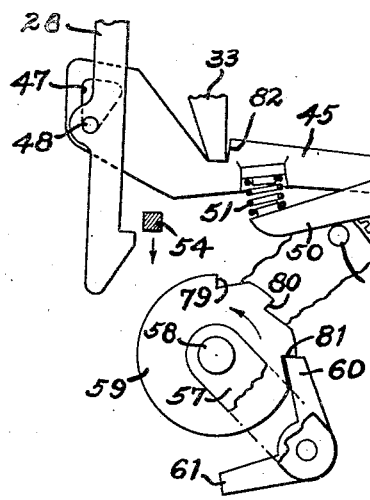
INVENTORS
BRUCE O. WATKINS
JOHN F. ATKINSON
BY
ATTORNEY Patented Oct. 23, 1945

2,387,373

UNITED STATES PATENT OFFICE 2,387,373

CIRCUIT DISCONNECTING DEVICE

Bruce O. Watkins, Brentwood, Mo., and John F. Atkinson, Cambridge, Mass.

Application December 28, 1942, Serial No. 470,338

12 Claims. (Cl. 200—108)

Our present invention relates to a new and improved zero current circuit disconnecting device, and more particularly to a circuit disconnecting device for rural electric power distribution systems in which the disconnecting device is used in connection with an automatically operating reclosing circuit breaker to disconnect a faulty or overload circuit from the distribution system.

An object of our invention is to provide a simple and inexpensive device which, in the event of a continuing fault or overload upon a distribution system, will operate in conjunction with an automatically operating reclosing circuit breaker to disconnect a faulted or overloaded portion of the system from the remaining portion of the distribution system in a practical and effective manner.

Another object of our invention is to provide a disconnecting device for use in conjunction with an automatically operating reclosing circuit breaker of a conventional design which will operate when the reclosing circuit breaker is open to disconnect a faulted or overloaded portion of the distribution system from the remaining portion of the system during a zero current period and prior to a subsequent reclosing operation of the reclosing circuit breaker.

Another object of our invention is to provide a new and novel circuit disconnecting device that may be used in conjunction wth a reclosing circuit breaker of the conventional type having an operating cycle that includes a plurality of circuit opening and reclosing operations and which may be arranged to operate successively to disconnect outlying portions of the distribution system in event of a sustained fault or overload occurring upon an outlying portion of the distribution system.

At the present time, where fault or overload protection of the nature contemplated by our invention is desired, it is the practice to provide a plurality of individual reclosing circuit breakers at different points throughout the system and to regulate the operation of these several reclosing circuit breakers in point of time through the medium of timing relays so that the reclosing circuit breaker nearest the faulted or overloaded portion of the system will operate to disconnect the faulted or overloaded portion of the system. This arrangement requires the use of a number of reclosing circuit breakers, each of which must have its own complicated operating mechanism, timing relays and oil immersed contacts with arc extinguishing means. This renders such a protective system complicated and expensive and is not at all economically adaptable to rural power distribution systems. It is, therefore, a further object of our invention to provide a circuit disconnecting device which will overcome the above objections and in which any number of our improved disconnecting devices may be employed in conjunction with a single reclosing circuit breaker to isolate any faulted or overloaded circuit from the remaining portion of the distribution system in a new and novel manner.

The power distribution system, when equipped with one or more of our improved zero current disconnecting devices in association with a reclosing circuit breaker, as contemplated by our present invention, differs in many respects from the present arrangements of the prior art. For example, when a continuing fault or overload occurs on a branch line circuit, the disconnecting device of that particular branch line will be initially influenced by said fault or overload condition and will also be influenced upon each reclosing operation of the main reclosing circuit breaker as long as said fault or overload condition exists, but in these operations the disconnecting device, unlike a fuse or circuit breaker of conventional type, will not operate to open its circuit control contacts until the reclosing circuit breaker has operated a predetermined number of times. Then, when the disconnecting device does open its circuit controlling contacts, this operation will occur during a period of zero current, or when the reclosing circuit breaker associated therewith is in its open circuit position. As a result, if the fault or overload condition is removed from the branch line before the reclosing circuit breaker has completed a predetermined portion of its operating cycle, the disconnecting device will remain closed and also reset itself for a similar series of responses should a subsequent fault or overload condition occur upon this particular branch line. An advantage in this is that since the branch line disconnecting device operates at a time of zero current, it does not require any oil immersed contacts or any arc extinguishing elements, such as would be required if its contacts were opened at a time when the main reclosing circuit breaker is in its closed circuit position. Therefore, the disconnector can be mounted in a simple porcelain bushing, or any other type of insulating enclosure, in a simple and inexpensive manner.

In the above described arrangement it is contemplated that only one of our improved disconnecting devices will be installed between the reclosing circuit breaker and a point of fault or overload in the system. However, it is also contemplated that two or more of the disconnecting devices might be employed in series by adjusting their operating time characteristics, as will be hereinafter pointed out, to provide for a successive disconnection of remote portions of the circuit in the event of a fault upon an outlying branch line or feeder section of the system.

For a better understanding of our invention reference should now be had to the following description when taken in connection with the accompanying drawings, wherein there is shown by way of illustration and not of limitation a device having a construction capable of operating in accordance with the invention.

Figure 4:
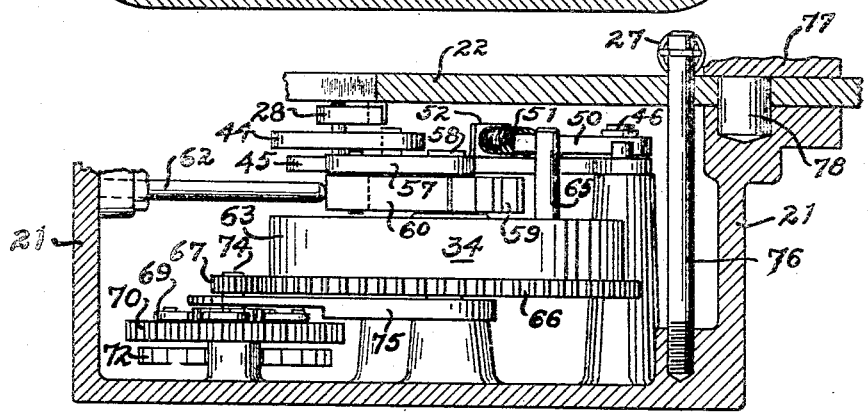

In the accompanying drawings:

Fig. 1 is a side view of a device made in accordance with our invention and with parts broken away and in section to reveal details of construction, Figure 2 is a side elevation showing a modified form of our device, Figure 3 is a fragmentary view showing details of the operating mechanism, Figure 4 is a sectional view of the device shown in Figure 3, taken along line IV—IV looking in direction of arrows, and Figures 5 to 10 inclusive are fragmentary views illustrating the several operating steps of the latch tripping mechanism.

The device of our present invention relates to and is an improvement upon the circuit disconnecting device disclosed in our previously filed and copending application Serial No. 446,000, filed June 5, 1942, in which there is described a device adapted for use in a power distribution system employing an automatically operating reclosing circuit breaker, as contemplated by our present invention.

As shown in Figure 1 of the drawings, our present device is constructed as a self-contained unit that is adapted to be mounted upon the crossarm of a transmission line supporting pole, or in any other similarly elevated position. The device, in its simplest form, comprises a suitable cylindrical insulator 10 that is open at one end. The insulator 10 carries terminals 11 and 12 at its ends and is supported at an intermediate point by an encircling clamp 13 which is carried by a bracket 14 that may be secured in the conventional manner upon the wooden crossarm of a pole or other structure 15 by means of bolts 16, only one of which is shown. Disposed within the cylindrical insulator 10 and at its upper end there is a stationary contact 17 with which a movable contact 18 cooperates. The movable contact 18 extends upwardly and is adapted to move axially within the insulator 10, and at its upper end it has a spider-like guide 19 that serves to center it with respect to the centrally disposed stationary contact 17. Mounted upon and over the lower open end of the cylindrical insulator 10 and secured thereto by means of a tubular extension 20 there is an enclosing casing or housing 21 which is electrically connected to the lower line terminal 12. Mounted within this housing 21 there is an operating lever arm 22 to which the lower end of the movable contact 18 is operatively connected through an insulating link 23. As shown, the lever arm 22 and the insulating link 23 also serve to support a flexible current carrying conductor 24 that completes an electrical connection between the lower end of the movable contact 18 and an energizing current coil 25 which forms a part of an electromagnetic device to be hereinafter described. The other side of the current coil 25 is shown as grounded to the housing 21 through a conductor 26 to thus complete a circuit between the movable contact 18 and the lower line terminal 12. The lever arm 22 is preferably biased downwardly by a spring 27 so as to carry the movable contact 18 out of engagement with the stationary contact 17. When the movable contact 18 is in a circuit completing engagement with the stationary contact 17, the lever arm 22 will be held against any downward or circuit opening movement under the influence of the spring 27 by means of a latch 28 until the latter is rendered inoperative, as will be hereinafter explained. At this point it need only be stated that the latch 28 is adapted to be rendered inoperative only after a predetermined number of overload current impulses have been impressed upon the current coil 25. To provide for a manual operation of the lever arm 22 and a closing of the circuit between the line terminals 11 and 12 by movement of the movable contact 18 into contact making engagement with the stationary contact 17, the lever arm 22 is provided with an extending portion in the form of a hook 29 which is disposed outside of the housing 21 where it may be engaged from below by an operating pole or other means in the hand of an operator. As an additional adjunct, it will be noted that the tubular extension 20 of the housing 21 carries an insulating bushing or guide 30 that serves to center the movable contact 18 and prevent any engagement thereof with the walls of the housing 21. At this point and with particular reference to the electromagnetic and automatic control features of our invention, it will be noted that the current coil 25 is mounted upon a magnetic field structure 31 adjacent to which there is pivotally mounted a normal current responsive armature 32 and an overload current responsive armature 33. The armature 32 serves to prevent a release of the latch 28 whenever current is flowing through the current coil 25, and the armature 33 is adapted to control the operations of a latch tripping mechanism, here designated generally by the numeral 34, which is regulated in its operations by a timing device 35, all as will appear more fully hereinafter.

In Figure 2 there is shown an embodiment of the present invention in which a hollow cylindrical insulator 36 is adapted to be secured at its upper end to the crossarm of a pole or other supporting device 37. In this device one of the line terminals, designated by the numeral 38, is mounted intermediate the ends of the insulator 36, and another line terminal 39 is mounted directly upon a modified enclosing housing 40 in which an operating mechanism of the type to be described is contained.

Upon referring to Figure 3 of the drawings, it will be seen that the latch 28 is biased into its latching position by means of a spring 41, and that the armatures 32 and 33 are respectively biased outwardly with respect to the magnetic field structure 31 by means of springs 42 and 43. It will also be noted that the armature 33 has a downwardly extending end 44 which is disposed in operating relation with the latch tripping mechanism previously designated generally by the numeral 34. Extending under the extending portion 44 of the armature 33 and in a substantially horizontal position, there is a latch controlling lever 45 which is pivoted to move upwardly about a supporting stud 46. At its extending end this latch controlling lever 45 has a triangular aperture 47 in which a pin 48 carried by the latch 28 extends so that when the latch controlling lever 45 is moved upwardly, it will act through the pin 48 to rotate the latch 28 in an unlatching direction about a pivotal support 49. Associated with the latch controlling lever 45 there is a second lever 50 which also pivots about the supporting stud 46 and independently of the latch controlling lever 45 so as to compress an energy storing spring 51 that is disposed between this second lever 50 and a boss 52 upon the latch controlling lever 45. A stop 53, carried by a downward extension of the latch controlling lever 45, serves to retain the lever 50 in operative relation with respect to the energy storing spring 51. In this figure of the drawings the movable contact operating lever arm 22 is shown as broken away and removed so as to more clearly reveal the above described arrangement. But, for the purpose of this description, the latch 28 is illustrated as in latching engagement with a latch receiving extension 54 that projects inwardly from a point along the lower edge of the movable contact operating lever arm 22. This extension 54 is here shown in section. When the latch receiving extension 54 is thus engaged by the latch 28, it will be understood that the lever arm 22 will be held in its upper position where it will retain the movable contact 18 in a circuit closed position with respect to the stationary contact 17 at the upper end of the insulator 10. To further simplify the description of the latch tripping mechanism, the extending portion 44 of the armature 33 is shown in a position approaching its final operation prior to a release of the latch 28. At this point it will be noted that the extending portion 44 of the armature 33 is provided with a substantially radial slot 55 into which a pin 56 carried by a pivoted link 57 extends. The link 57 is pivoted to swing about a centrally disposed shaft 58 about which a ratchet wheel 59 that forms a part of the latch tripping mechanism 34, rotates. The extending or free end of the link 57 is here shown as carrying a ratchet engaging pawl 60 that is biased into an operative position by means of a spring (not shown), and at its opposite side this ratchet engaging pawl 60 has an upstanding arm 61 that engages a stop 62 which will operate to hold the pawl 60 out of operating relation with the ratchet wheel 59 when the armature 33 is released by the magnetic field 31.

As is more clearly illustrated in Figure 4 of the drawings, the latch tripping mechanism 34 includes a drum-like housing 63 in which there is disposed a spiral or clock spring (not in view) which serves to bias the housing 63 and the ratchet wheel 59 in a clockwise direction, as viewed in Figure 3. Extending upwardly from the top of the housing 63 and normally held against a stop 64, there is an operating pin 65 that is adapted to engage the second lever 50 and compress the energy storing spring 51 after a predetermined number of operations of the armature 33 under the influence of the magnetic field 31. Secured to the housing 63 and at its bottom edge there is a gear 66 that meshes with a pinion 67 which is connected through a ratchet wheel 68 and pawls 69 to a second gear 70 that meshes with a pinion 71 which drives the timing device 35. The pinion 71 is fixed to a star wheel 72 that is controlled by an oscillating inertia weight-controlled escapement dog 73 in a manner well understood in the art. Disposed between the shaft 58 of the tripping mechanism 34 and a shaft 74 about which the pinion 67 and the ratchet wheel 68 turn, there is a spacing plate 75 that serves to retain the latch tripping mechanism 34 and the timing device 35 in cooperating relation. It will also be noted that the spring 27, which serves to bias the operating lever arm 22 downwardly, is secured at its fixed end to an upstanding stud 76 that is threaded in the side of the housing 21. The operating lever arm 22 is also here shown as mounted between the housing 21 and a cover-forming portion 77 where it will pivot about a stud 78 that is recessed in a flanged portion of the housing 21.

Reference is now made to Figure 1 and to Figures 5 to 10 inclusive of the drawings for a detailed description of the operation of our invention when used in series circuit with an automatically operating reclosing circuit breaker of the conventional fault or overload responsive type as a secondary circuit disconnecting device.

As suggested above, the device of our invention is primarily intended for use upon a power transmission system that is protected by an automatically operating reclosing circuit breaker, and in operation its purpose is to disconnect an overloaded branch line circuit from the system in the event of a permanent fault or overload after the reclosing circuit breaker has opened and reclosed the system circuit a predetermined number of times. Therefore, in describing the operation of our device it will be assumed, for simplicity, that one or our devices is connected in series circuit with an automatic reclosing circuit breaker of a type that will provide at least three complete circuit opening and reclosing operations before becoming locked out, as provided for in reclosing circuit breakers of this type. When used with such a circuit breaker, our device will be so constructed and arranged that it will operate to open the circuit through its contacts during that period immediately following the third circuit opening operation of the main reclosing circuit breaker and prior to the third circuit reclosing operation thereof With the above in mind, it will also be assumed that our device, as illustrated in Figure 1 of the drawings, is connected in one of the conductors of a branch line circuit with its terminals 11 and 12 in series circuit with the contacts of a main line reclosing circuit breaker of the above described type, and that the movable contact 18 is latched in its circuit closed position by the latch 28. At this point it will be noted that the extension 44 of the armature 33 will be held in its left hand position by the biasing spring 43 and with the link 57 in a position to carry the ratchet engaging pawl 60 in a direction to engage the first of a series of three notches formed in the ratchet wheel 59. With the armature 33 in this position, the ratchet engaging pawl 60 will be held out of engagement with the ratchet wheel 59 by the stop 62 that engages its rearwardly extending arm 61. Now, should an overload be imposed upon the circuit through the movable contact 18 of our device, this overload current will traverse the coil 25 of the electromagnetic field structure 31. This will attract the armature 33 and cause it to swing in a counter-clockwise direction. This movement of the armature 33 will carry the link 57 around its central pivot 58 in a similar direction and, at the same time, the upstanding end 61 of the ratchet engaging pawl 60 will disengage the stop 62 so that the ratchet engaging pawl 60 will then turn in response to its biasing spring and engage the first one of a series of three notches formed in the periphery of the ratchet wheel 59. These three notches in the ratchet wheel 59 are more clearly illustrated in Figures 5 to 10 of the drawings, where they are designated respectively by the numerals 79, 80 and 81.

At this point and upon referring particularly to Figure 5 of the drawings, it will be seen that when the link 57 is turned, as indicated above, the ratchet engaging pawl 60 will move into register with the notch 79 and thus carry the ratchet wheel 59 and the drum-like housing 63 in a counter-clockwise direction through an arc of substantially 90° and thus move the lever operating pin 65 into the position illustrated in Figure 6 of the drawings. During this operation of our device, it will be understood that the same overload current impulse will have operated upon the main reclosing circuit breaker and, as a result, its contacts will have likewise operated to open the circuit. This circuit opening operation of the main reclosing circuit breaker will, therefore, establish a zero current condition in the coil 25 of the electromagnetic field structure 31 and, as a result, the armature 33 will be moved outwardly in a clockwise direction under the influence of its biasing spring 43 and carry the link 57 and the ratchet engaging pawl 60 in a reverse direction until its upstanding end 61 again engages the stop 62, as illustrated in Figure 7. It will also be understood that during this return movement of the ratchet controlling link 57, the operating pin 65 will be likewise moved backward under the influence of the biasing spring previously referred to as mounted within the housing 63. Therefore, with the parts in the position illustrated in Figure 7 it will be seen that when the main reclosing circuit breaker again operates to reclose the circuit upon the assumed continuing overload, a second overload current impulse will be impressed upon the coil 25 of the electromagnetic field structure 31 and, as a result, the armature 33 will be again attracted and carry the ratchet engaging pawl 60 around in a counter-clockwise direction until its ratchet engaging end engages with the second or notch 80 of the ratchet wheel 59. At this point it will be understood that each of the return movements of the ratchet wheel 59 and the operating pin 65 will be under the control of the timing mechanism 35 and, therefore, the ratchet wheel 59 will return more slowly to its initial position than will the ratchet engaging pawl 60 which is moved back free of the timing mechanism 35 by the biasing spring 43 which is attached to the armature 33. In this connection it should also be pointed out that because of the one-way ratchet drive provided by the ratchet wheel 68 and the pawls 69 between the pinion 74 and the driving gear 70 of the timing mechanism 35, the forward or operating movement of the operating pin 65 will be free and uninfluenced by this timing mechanism. As a result of the delay thus introduced by the timing mechanism 35, it will be noted that the notch 80 of the ratchet wheel 59 and the operating pin 65 will not have returned to their initial positions and, as a result, some lost motion will occur before the ratchet engaging pawl 60 engages this notch. Therefore, the operating pin 65 will only be moved in a counter-clockwise direction through an angle of approximately 45°, or in other words, through that portion of the angular movement remaining in the travel of the link 57 when operating at this time. This will carry the operating pin 65 around and into the position shown in Figure 8. At the time of this second impulse of current through the coil 25, it will also be understood that the main reclosing circuit breaker will have again operated to open its circuit and, as a result, the link 57 with the ratchet engaging pawl 60 will be again carried back in a clockwise direction under the influence of the armature biasing spring 43 where the ratchet engaging pawl 60 will come to rest in the position indicated in Figure 9. Now, upon the next reclosing operation of the main reclosing circuit breaker, the armature 33 will be attracted and operate in the manner above described to again move the link 57 with the ratchet engaging pawl 60 in a counter-clockwise direction so as to bring the operating pin 65 into engagement with the latch controlling second lever 50, as indicated in Figure 10. At this point it will be noted that the lever 50 will have been moved upwardly so as to compress the energy storing spring 51 and thus place an operating bias upon the latch controlling lever 45. Then, following this operation, the main reclosing circuit breaker will again open its circuit and the coil 25 of the electromagnetic field structure 31 will be again deenergized. This will release the armature 33. At this point it will also be understood that the armature 32 will, like the armature 33, have again moved to the left under the influence of its biasing spring 42 where it will be positioned as here indicated. This will displace the end of the armature 32, and because of a notch 82 provided in the latch controlling lever 45, it will permit the latch controlling lever to move upwardly under the influence of the energy storing spring 51. Then, as the latch controlling lever is thus moved upwardly, the diagonally disposed side of its triangular aperture 47 will act upon the pin 48 and move the latch 28 into an inoperative position with respect to the latch receiving extension 54 upon the movable contact operating lever 22 and thus permit the movable contact 18 to move downwardly by gravity or under the influence of the biasing spring 27. This will open the circuit between the terminals 11 and 12 of our device and thus disconnect that portion of the power distribution system which is disposed therebeyond with respect to the main reclosing circuit breaker. After this operation of our device the main reclosing circuit breaker will again reclose its contacts, and since the fault or overload condition will have been removed by a disconnection of that portion of the system controlled by our device, the main reclosing circuit breaker contacts will reclose and remain in their closed circuit position so that uninterrupted service will be restored to the remaining portion of the system.

In the drawings and in the above description we have illustrated and described our invention as of a type that is adapted to operate with a reclosing circuit breaker having operating characteristics which will provide for a definite number of circuit opening and reclosing operations, but it is to be understood that our device can be constructed and arranged to operate with a circuit breaker capable of providing any desired number of circuit opening and reclosing operations. It will also be understood that several of our devices might be used to sectionalize a system of distribution in a progressive manner, as disclosed in our above identified copending application, by merely providing a number of our devices with ratchet wheels 59 having different numbers of notches with which the ratchet engaging pawl 60 may cooperate in moving the operating pin 65 into operating relation with the latch releasing mechanism.

While we have, for the sake of clearness and in order to disclose the invention so that the same can be readily understood, described and illustrated specific devices and arrangements, we desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described our invention, what we claim and desire to secure by Letters Patent is:

1. In a zero current electromagnetic circuit controlling device, the combination of cooperating relatively movable contacts, a releasable mechanism adapted to operate said contacts into an open circuit position, a latch for holding said mechanism with said contacts in a closed circuit position, an electromagnetic field structure excited by current passing through said relatively movable contacts, means including an energy storing spring for moving said latch into an inoperative position with respect to said releasable mechanism, an armature responsive to said electromagnetic field structure cooperating with said means to store energy in said energy storing spring, and a second armature responsive to said electromagnetic field structure adapted to prevent an operation of said means including said energy storing spring when said magnetic field structure is excited by current flowing through said contacts, whereby said relatively movable contacts will be prevented from moving into an open circuit position when current is flowing therethrough.

2. In a zero current electromagnetic circuit controlling device, the combination of cooperating relatively movable contacts, a releasable mechanism adapted to operate said contacts into an open circuit position, a latch for holding said mechanism with said contacts in a closed circuit position, an electromagnetic field structure including a winding excited by current passing through said relatively movable contacts, means including a normally inactive energy storing spring for moving said latch into an inoperative position with respect to said releasable mechanism, an armature responsive to said electromagnetic field structure, a ratchet mechanism operated by said armature and operative upon a predetermined number of responses of said armature to store energy in said energy storing spring, and a second armature also responsive to said electromagnetic field structure adapted to prevent an operation of said means under the influence of said energy storing spring when current is flowing through the winding of said magnetic field structure, whereby said relatively movable contacts will be prevented from moving into an open circuit position when current is flowing therethrough.

3. In a zero current electromagnetic circuit controlling device, the combination of cooperating relatively movable contacts, a releasable mechanism adapted to operate said contacts into an open circuit position, a releasable latch for holding said mechanism with said contacts in a closed circuit position, an electromagnetic field structure including a winding excited by current passing through said relatively movable contacts, a normally inactive means for moving said latch into a releasing position with respect to said releasable mechanism, an energy storing compression spring adapted when compressed to operate said normally inactive means, ratchet driven means operative to compress said energy storing spring, a movable armature operating upon a succession of responses to said electromagnetic field to drive said ratchet driven means in a step-by-step manner and compress said energy storing spring, and a second armature responsive to said electromagnetic field structure adapted to prevent an operation of said normally inactive means by said energy storing spring when current is flowing through said electromagnetic means, whereby said relatively movable contacts will be prevented from moving into an open circuit position when current is flowing therethrough.

4. In a zero current circuit disconnecting device adapted for use with an automatic reclosing circuit breaker, the combination of cooperating power line circuit controlling contacts, means tending to move said cooperating contacts relative to each other and into an open circuit position, a latch operating contrary to said means for holding said contacts in a circuit closed position, an electromagnetic field structure having an exciting coil connected in series circuit with said cooperating contacts, an armature operatively associated with said electromagnetic field structure, a ratchet mechanism adapted to be operated in a step-by-step manner by said armature upon each overload current energization of said exciting coil, latch tripping means operated by said ratchet mechanism for releasing said latch after a predetermined number of step-by-step operations thereof by said armature, and a second armature also operatively associated with said electromagnetic field structure arranged and adapted to prevent the operation of said latch tripping means when current is flowing through the exciting coil of said electromagnetic field structure.

5. In a zero current circuit disconnecting device adapted for use with an automatic reclosing circuit breaker, the combination of cooperating power line circuit controlling contacts, means tending to move said cooperating contacts relative to each other and into an open circuit position, a latch operating contrary to said means for holding said contacts in a circuit closed position, an electromagnetic field structure having an exciting coil connected in series circuit with said cooperating contacts, an armature operatively associated with said electromagnetic field structure, a ratchet mechanism adapted to be operated in a step-by-step manner by said armature upon each energization of said exciting coil, latch tripping means operated by said ratchet mechanism for releasing said latch after a predetermined number of step-by-step operations thereof by said armature, a second armature also operatively associated with said electromagnetic field structure arranged and adapted to prevent the operation of said latch tripping means when current is flowing through the exciting coil of said electromagnetic field structure, and a timing mechanism adapted to prevent said ratchet mechanism from operating said latch tripping means whenever its predetermined number of step-by-step operations imparted thereto by said first armature do not occur within a predetermined period of lapsed time.

6. In a zero current circuit disconnecting device adapted for use with an automatic reclosing circuit breaker, the combination of cooperating power line circuit controlling contacts adapted to be connected in series circuit with a reclosing circuit breaker, biasing means for moving said cooperating contacts relative to each other and into an open circuit position, a latch means operating contrary to said biasing means for holding said circuit controlling contacts against movement and in a circuit closed position, an electromagnetic field coil connected in series circuit with said cooperating power line circuit controlling contacts, a pivotally mounted armature operatively associated with said electromagnetic coil and adapted in the event of an overload on the power line circuit to operate upon each energization of said field coil resulting from a reclosing of the circuit by an associated reclosing circuit breaker, a ratchet mechanism adapted to be operated in a step-by-step manner by said armature upon each movement thereof in response to an energization of said electromagnetic coil, normally inoperative spring means adapted to be rendered operative to move said latch means into an inoperative position after a predetermined number of step-by-step operations of said ratchet mechanism, and an inertia type timing device associated with said ratchet mechanism adapted to render said ratchet mechanism inoperative with respect to said spring means when its predetermined number of step-by-step movements do not occur within a predetermined period of lapsed time.

7. In a zero current circuit disconnecting device adapted for use with an automatic reclosing circuit breaker, the combination of cooperating power line circuit controlling contacts adapted to be connected in series circuit with a reclosing circuit breaker, biasing means for moving said cooperating contacts relative to each other and into an open circuit position, a latch means operating contrary to said biasing means for holding said circuit controlling contacts against movement and in a circuit closed position, an electromagnetic field coil connected in series circuit with said cooperating power line circuit controlling contacts, a pivotally mounted armature operatively associated with said electromagnetic coil and adapted in the event of a sustained overload on the power line to operate upon each energization of said field coil resulting from a reclosing of the circuit by an associated reclosing circuit breaker, a ratchet mechanism adapted to be operated in a step-by-step manner by said armature upon each movement thereof in response to said electromagnetic coil, normally inoperative spring means adapted to be rendered operative to move said latch means into an inoperative position after a predetermined number of step-by-step operations of said ratchet mechanism, an inertia type timing device associated with said ratchet mechanism adapted to render said ratchet mechanism inoperative with respect to said spring means when its predetermined number of step-by-step movements do not occur within a predetermined period of lapsed time, and a second armature operatively associated with said electromagnetic field coil for preventing the normally inoperative spring means from moving said latch means into an inoperative position during any period when said power line circuit controlling contacts are closed and current is flowing through said electromagnetic coil.

8. In a zero current circuit disconnecting device of the character described, the combination of relatively movable contacts biased into an open circuit position, a retaining latch for holding said contacts against said bias and in a closed circuit position, lever means having an energy storing device for rendering said latch inoperative and permit a circuit opening operation of said contacts, electromagnetic means having an armature operatively responsive to overload current passing through said contacts and adapted after a number of successive operations to store energy in the energy storing device of said lever means, and a second armature also responsive to said electromagnetic means adapted to first prevent a latch releasing operation of said lever means while said electromagnetic means is energized and then immediately following a predetermined deenergization of said electromagnetic means to release said lever means and permit a latch releasing movement thereof by said energy storing device.

9. In a zero current circuit disconnecting device of the character described, the combination of a pair of cooperating circuit controlling contacts, means for biasing one of said contacts into an open circuit position, an operating mechanism for moving said one contact into a closed circuit position in opposition to said biasing means, a latch associated with said operating mechanism for holding said circuit controlling contacts in engagement with each other, a pivotally mounted member for moving said latch into an inoperative position, energy storing spring means arranged to impart a latch releasing movement to said pivotally mounted member, an electromagnetic field structure adapted to be energized by current passing through said contacts when in their closed circuit position, an armature pivotally mounted in cooperating relation with and biased outwardly with respect to said electromagnetic field structure, a notching mechanism operated by said armature and having means adapted to compress and store energy into said energy storing spring after a predetermined number of operations thereof, and a second armature also cooperating with said electromagnetic field structure and biased into an inoperative position with respect thereto, said latter armature being first adapted to hold said pivotally mounted member against a latch releasing operation while said energy storing spring is being compressed to store energy therein and subsequently upon a deenergization of said electromagnetic field structure to permit said pivotally mounted member to trip said latch and release said contact controlling mechanism at the first current zero following a predetermined number of operations of said notching mechanism by said first armature.

10. In a zero current circuit disconnecting device for use with an automatic reclosing circuit breaker, the combination of cooperating power line circuit controlling contacts, means tending to move said cooperating contacts relative to each other and into an open circuit position, a latch operating contrary to said means for holding said contacts in a circuit closed position, an electromagnetic field structure having an exciting coil connected in series circuit with said cooperating contacts, an armature operatively associated with said electromagnetic field structure, a ratchet mechanism adapted to be positively operated in a step-by-step manner by said armature upon each energization of the exciting coil of said electromagnetic field structure, a latch tripping means operable after a predetermined number of step-by-step operations of said ratchet mechanism to trip said latch, and means adapted to prevent an operation of said latch tripping means when current is flowing through said circuit controlling contact and the exciting coil of said electromagnetic field structure.

11. In a zero current circuit disconnecting device adapted for use with an automatic reclosing circuit breaker, the combination of cooperating power line circuit controlling contacts, means tending to move said cooperating contacts relative to each other and into an open circuit position, a latch for holding said contacts against movement by said means and in a circuit closed position, an electromagnetic field structure having an exciting coil connected in series circuit with said cooperating contacts, an armature operatively associated with said electromagnetic field structure, a ratchet mechanism adapted to be moved in a step-by-step manner by said armature upon each overload current energization of said exciting coil, a latch tripping means operable after a predetermined number of step-by-step movements of said ratchet mechanism by said armature, a timing mechanism associated with said ratchet mechanism adapted to prevent an operation of said latch tripping means by said ratchet mechanism whenever said predetermined number of step-by-step operations as imparted thereto by said armature do not occur within a predetermined period of lapsed time, and means also operatively associated with said electromagnetic field structure arranged and adapted to prevent the action of said latch tripping means while current is flowing through the exciting coil of said electromagnetic field structure.

12. In a zero current electromagnetic circuit controlling device, the combination of cooperating relatively movable contacts, a releasable mechanism adapted to operate said contacts into an open circuit position, a releasable latch for holding said mechanism with said contacts in a closed circuit position, an electromagnetic field structure including a winding excited by current passing through said relatively movable contacts, a normally inactive means for moving said latch into a releasing position with respect to said releasable mechanism, an energy storing compression spring adapted when compressed to operate said normally inactive means, ratchet driven means operative to compress said energy storing spring, a movable armature operating upon a succession of responses to said electromagnetic field to drive said ratchet driven means in a step-by-step manner and compress said energy storing spring, and means adapted to prevent an operation of said normally inactive means by said energy storing spring when current is flowing through said electromagnetic means, whereby said relatively movable contacts will be prevented from moving into an open circuit position when current is flowing therethrough.

BRUCE O. WATKINS.
JOHN F. ATKINSON.